Sept. 15, 1959

F. K. JONES ET AL 2,904,194

TOBACCO STRINGER

Filed Aug. 27, 1957

INVENTORS
*Frank K. Jones* and
*Norris H. Holt*
BY
*Mason, Fenwick & Lawrence*
ATTORNEYS Sept. 15, 1959     F. K. JONES ET AL     2,904,194
TOBACCO STRINGER Filed Aug. 27, 1957     5 Sheets-Sheet 3

INVENTORS
*Frank K. Jones* and
*Norris H. Holt*
BY *Mason, Fenwick & Lawrence*
ATTORNEYS

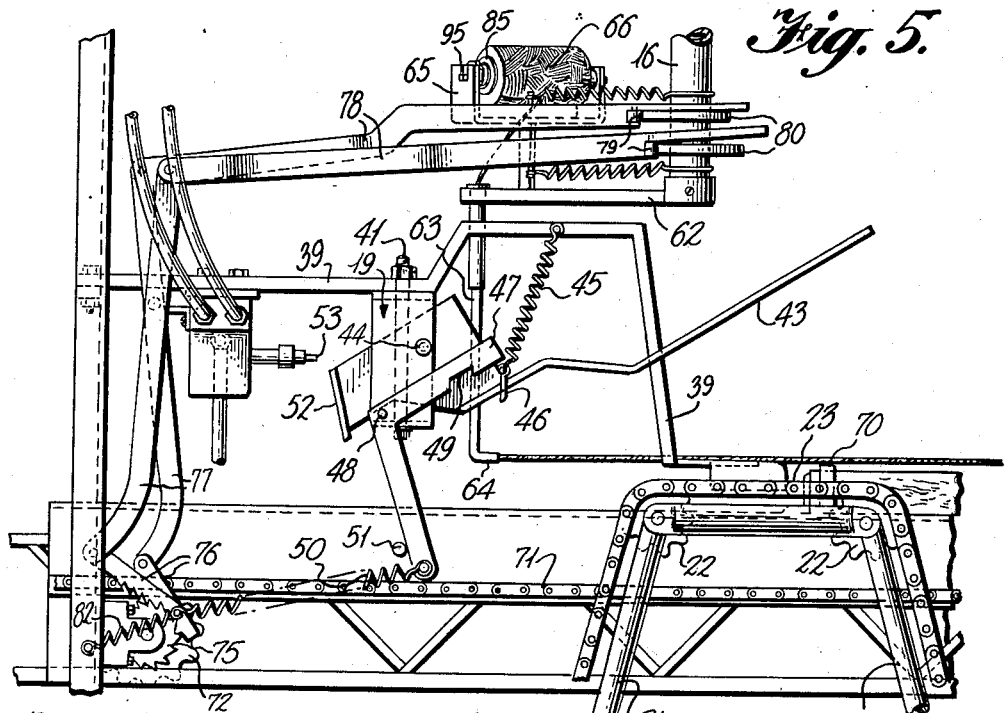

Sept. 15, 1959 F. K. JONES ET AL 2,904,194
TOBACCO STRINGER
Filed Aug. 27, 1957 5 Sheets-Sheet 5

TOBACCO LEAVES

INVENTORS
*Frank K. Jones* and
*Norris H. Holt*
BY
*Mason, Fenwick & Lawrence*
ATTORNEYS

United States Patent Office 2,904,194
Patented Sept. 15, 1959

2,904,194

TOBACCO STRINGER

Frank K. Jones, Red House, and Norris H. Holt, Lynchburg, Va.

Application August 27, 1957, Serial No. 680,481

17 Claims. (Cl. 214—5.5)

This invention relates to automatically operated means for tying tobacco leaves to sticks for hanging in a curing barn.

In many tobacco-growing areas, particularly in the handling of so-called flue-cured tobacco, the leaves are removed from the plants as they ripen and tied to sticks for hanging in the curing barns. This requires many trips over a field picking the leaves and much more effort than in those areas where the entire plant is cut and hung upon a stick for curing.

The object of the present invention is to provide a machine which can be run through the fields and as the leaves are picked automatically tie them on sticks for hanging.

Another object is to provide such a machine which will be operative to tie leaves only when tripped alternately by leaves on opposite sides of a stick carrier so that leaves will be tied first on one side and then on the other of the stick.

A further object of the invention is to provide a machine of this character having continuously moving means to feed leaves to a central stick and tying position from either side thereof, with the leaves themselves serving to trip the tying mechanism for operation so that when no leaves are fed the tying mechanism is inoperative.

Other objects of the invention will become apparent from the following description of one practical embodiment thereof when taken in conjunction with the drawings which accompany, and form part of, this specification.

In the drawings:

Figure 5 is a view similar to Figure 3, but with the mechanism for initiating movement of the tying means tripped to render the tying means inoperative;

Figure 6 is a vertical, transverse section taken on the line 6—6 of Figure 3;

Figure 10 is a vertical section through the leaf-feeding chain drive, and is taken on the line 10—10 of Figure 1; and, Figure 11 is a longitudinal section through the string holder and the string take-up mechanism.

Figure 1:
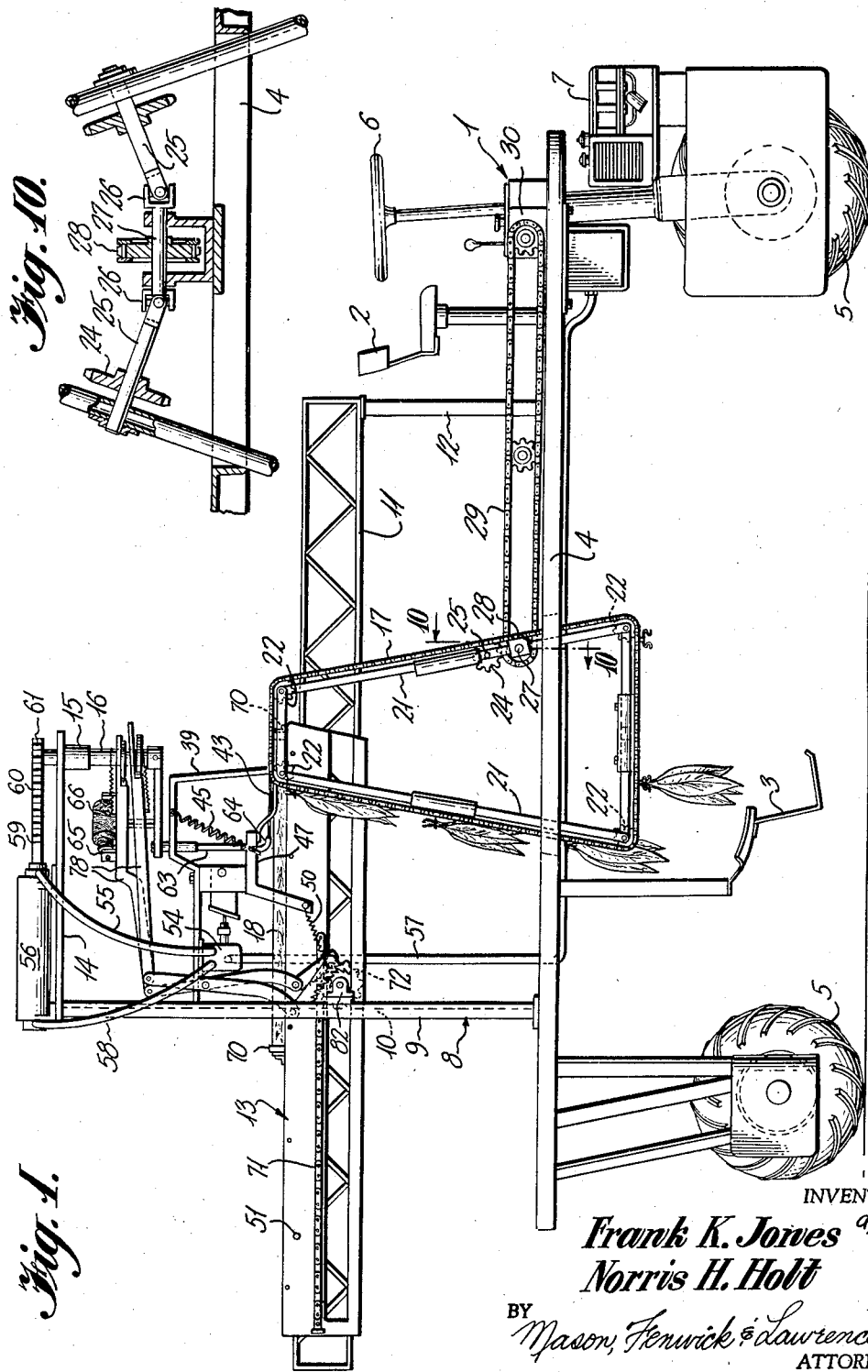
Figure 1 is a side elevation of a machine for tying tobacco leaves upon sticks and embodying the principles of the present invention.

In general, the invention is concerned with a machine having means to feed tobacco leaves to a central tying station from opposite sides thereof, with the feeding means arranged to deliver leaves to the tying station in alternation. Means are provided at the station to wrap a loop of cord about the stems of leaves so presented while the leaves are held against the sides of a tobacco stick and to advance the stick during each tying operation, to secure leaves in place on opposite sides of the stick, spaced longitudinally of the stick, with the cord forming a zigzag pattern across the top of the stick to connect the alternately placed leaves.

Referring to the drawings in detail, there is shown a mobile unit 1 which can be run across a tobacco field and has a seat 2 for an operator and seats 3 for leaf pickers. The seats 3 are suspended from a platform 4 mounted upon wheels 5 and carrying the working parts of the machine. The front wheel of the machine can be steered by means of the steering wheel 6 and is the driving wheel, being powered from a suitable engine 7. A vertical frame 8, consisting of channel members 9 held in transversely spaced relation by means of suitable cross members 10, is fixed upon the platform 4 and supports most of the operating mechanism. The vertical frame 8 supports the rear section of a horizontally positioned truss 11 which has its forward end seated upon vertical legs 12 projecting upward from the platform 4. Truss 11 forms a part of the overall frame structure and, at the same time, serves as a track for a stick holder 13. The stick holder is mounted for sliding movement upon the truss and is moved forwardly step-by-step as the tying operation progresses. The structural details of the stick holder and the mechanism by which it is moved will be described later.

The top of frame 8 carries a forwardly projecting plate 14 having a downwardly extending boss 15 which serves to journal a vertical shaft 16. The shaft forms a part of the tying mechanism, and the projected axis of this shaft forms the center toward which leaves are fed by means of feed chain 17 and about which the tying mechanism moves in looping the stems of the leaves. For simplicity of description, the projection of this axis upon the tobacco stick 18 will be referred to as the focal point and is indicated at F in Figure 4. When leaves carried by the feed chains 17 reach positions on one side or the other of the focal point, they will actuate a trip mechanism 19 to initiate operation of tying mechanism 20.

The feed chains are shown as arranged in a pair, one adjacent each of the seats 3, with the two chains extending upwardly and converging toward one another so that their upper ends are on opposite sides of the path of stick travel to bring leaves to positions closely adjacent the sides of the stick and adjacent the focal point. The feed chains are mounted upon frames 21 which are fixed to the platform 4 in any desired manner. The apparatus will work equally well if the chains 17 are horizontally arranged, as would be the case if the tying apparatus were used on a stationary machine rather than one which can be moved through a field. Frames 21 carry sprocket wheels 22 about which the feed chains are trained. The particular path which the chains follow is not important, so long as each chain follows a path parallel to the line of stick movement for a relatively short distance adjacent the focal point. This part of the chain pattern is indicated at 23. The chains may be driven in any suitable manner such as by the drive sprockets 24 mounted upon shafts 25 connected by universal joints 26 to a driven shaft 27. Shaft 27 carries a driven sprocket 28 about which drive chain 29 passes. Chain 29 may be driven from a suitable power take off on a gear 30, powered by the engine 7. By reason of this drive, the movement of the two chains will be synchronous and continuous.

Each of the chains 17 will be provided with a plurality of leaf-holding clips 31. These will be arranged at equally spaced positions along the chain, and the clips on one chain will be staggered relative to the clips on the other, so that the clips of the respective chains will arrive adjacent the focal point in alternation. The clips are mounted upon brackets 32 attachable to the links of the chains by any suitable means. The brackets are shown attached by substitute pivot pins 33 connecting the adjacent chain links so that the bracket will be pivotally mounted and when leaves are in the clips will remain in one position to permit the leaves to hang vertically throughout their travel on the chains. The clips per se will consist of a fixed arm 34, rigidly attached to the bracket 32, and a movable arm 35 pivotally attached to the bracket 32 by means of a pivot pin 36. A spring 37 will have one end connected to the movable arm and the bracket, in such position as to pass over the pivot 36 when the arm is moving from open to closed, or closed to open positions, to provide the necessary spring tension to give the arm a snap action and to hold it in open or closed position. The movable arm will have an inwardly projecting tongue 38 lying in the path of leaves being inserted in the clip to be contacted by the leaves to trip the movable arm and cause it to move to closed position. Thus, it will be necessary for the pickers occupying the seats 3 simply to pick the leaves from the plant, present them in bundles to the clips as they move along the chain path and the clips, upon contact by the leaves, will snap closed. The leaves will be held by spring tension and travel along the path up to the focal point.

Figure 3:
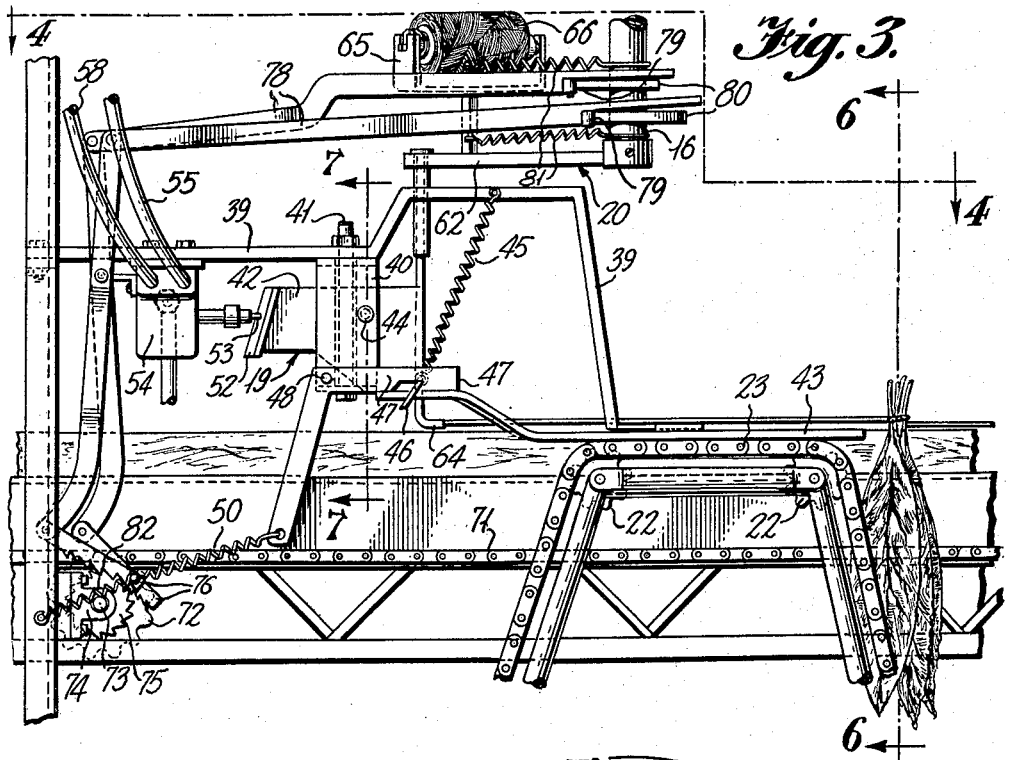
Figure 3 is an enlarged elevational view of the tying, stick-advancing and leaf-feeding mechanisms.

As the clips bearing the leaves move onto the top horizontal section 23 of the chain path, the leaves carried by the clips will contact an arm of the trip mechanism 19. The trip is mounted upon a bracket 39 fastened to the vertical frame 8 and overlying the stick holder 13, and an inverted U-shaped mounting bracket 40 is pivotally connected to the underside of bracket 39, upon a vertical bolt 41, in order that it may rock in a horizontal plane. The trip proper consists of a mounting frame 42 and a pair of forwardly projecting arms 43, which are secured to the bracket 40 by means of a horizontal pivot pin 44 which extends through the arms of the bracket 40 and through the mounting frame 42. This permits the arms and mounting frame to be tilted in a vertical direction. The trip proper is biased to an upwardly tilted, inoperative position, as shown in Figure 5, by means of a spring 45 connected between the mounting frame 42 and bracket 39. Frame 42 is provided with horizontally extending projections 46 adapted to be engaged by a latch 47 when the trip is moved downwardly, to hold the trip arm in their proper operative plane as shown in Figure 3. Latch 47 is in the form of a bell crank, pivoted at 48 to the bracket 40, and having a notch 49 in one arm to engage over the projections 46. The latch is held in its operative position by means of a spring 50 which is attached to one arm of the latch and to certain ratchet mechanism to be described later. The latch is tripped by means of a pin 51, carried by the stick holder 13, as the stick holder moves forward in a manner to be described.

The frame 42 of the trip carries an inclined plate 52 at its back end to engage, and operate in alternation, plungers 53 of a valve 54 which controls the operation of the tying mechanism. When the trip is in operative position and at a mid point directly overlying the stick holder, plate 52 will be in contact with plungers 53 holding each at a neutral position. When the trip is rocked to one side or the other, it further depresses one of the plungers 53 to connect an air line 55, extending from valve 54 to a pneumatic cylinder 56, to a line 57 which runs from a source of compressed air, and at the same time release the pressure on the other plunger permitting it to connect its line 58, from the control valve 54 to the cylinder 56, to atmosphere. Thus, when the trip is rocked it will connect one end or the other of the cylinder 56 to the source of compressed air and open the other side to atmosphere. In this manner, the valve piston and its rod 59 can be caused to move to the right or to the left as viewed in Figures 1 and 2 as desired.

The trip arms are contacted and moved to tilt the trip assembly by bundles of leaves carried in the clips as they move along the flat horizontal section 23 of the feed chain path. Movement of the piston rod 59 will cause shaft 16 of the tying mechanism to oscillate and thereby loop the tying string about the stems of the leaf bundle which has just actuated the trip arm. To do this, the piston rod 59 has at its outer end a rack 60 which engages a gear 61 fixed to the shaft 16. Shaft 16 carries an arm 62 at its lower end which has a string guide 63 pivotally mounted on the end of the arm. The string guide is tubular, to permit the free passage of string therethrough, and has its lower end bent to lie in a horizontal plane. Due to this arrangement the lower horizontal portion 64 of the string guide may freely swivel and remain in alignment with the string and facing toward the point of attachment of the string to the stick or to the last loop formed as the case may be. The arm 62 also carries a support 65 for a spool of string 66.

The rack movement will be such as to provide an oscillating movement of the shaft of approximately 300° amplitude. The two limit positions of the tying arm and thread guide are shown in full and dotted lines in Figure 4. During the oscillating movement, the string will be looped about the stems of the bundle of leaves held in the clip of one of the feed chains and, after the loop has been formed, the bundle will be pulled from the clip against the side of the stick and the stick will be advanced to carry the just-tied bundle beyond the orbit of the tying mechanism.

It will be evident from an inspection of the drawings that as the string guide 63 travels about its orbit its distance will vary from the bundle about which the string is being looped. It is essential, however, that the string be held taut during the entire looping operation. It is also important that the jerk resulting from the oscillatory movement of the arm be minimized. To accomplish this, the string spool 66 is mounted upon a sleeve 83, having one end against a clutch plate 84, and a second clutch plate on washer 85 is fitted on the sleeve against the other end of the spool. A coil spring 86 is next slipped on the sleeve and seated against the clutch plate 85. A nut 87 is threaded on the end of the sleeve and tightened until the spring 86 causes the desired frictional pressure between the spool ends and the clutch plates 84 and 85. Thus, the spool may be rotated if sufficient pull is exerted on the spring to overcome the frictional drag. The sleeve has bushings 88 and 89 in its ends, which are bored to journal a shaft 90. A coil spring 91 surrounds the shaft 90 and has one end anchored in a hole 92 in shaft 90 and the other end in a slot 93 in sleeve 83. By reason of this structure, rotation of the sleeve relative to the shaft will cause the spring 91 to wind, increasing its tension. Shaft 90 has projecting squared ends 94 which fit in squared notches 95 in the string holder 65.

As the tension is exerted on the string as the looper oscillates, the frictional grip between the spool and the fixed clutch plate 84 will hold the spool fixed to the sleeve 83 and wind the spring. When tension in the spring is built up, the spool will slip relative to the sleeve permitting string to pay out and the sleeve to remain motionless. If pulling tension on the string is relaxed, the stored up energy in the spring 91 will cause the sleeve and spool to rotate in a reverse direction, retrieving the string to hold it taut.

Figure 4:
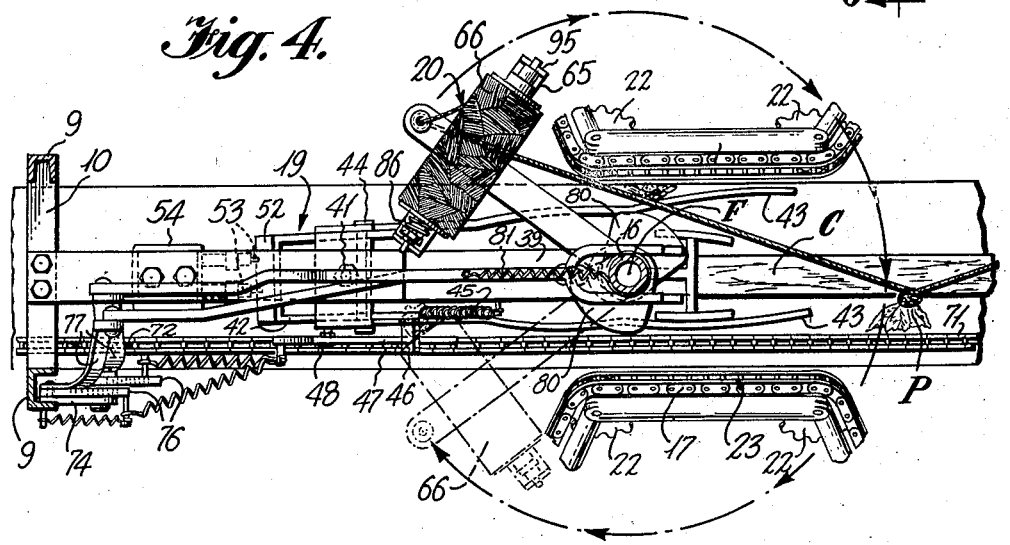
Figure 4 is a section on the line 4—4 of Figure 3, showing in top plan the tying apparatus shown in Figure 3.
Figure 7:
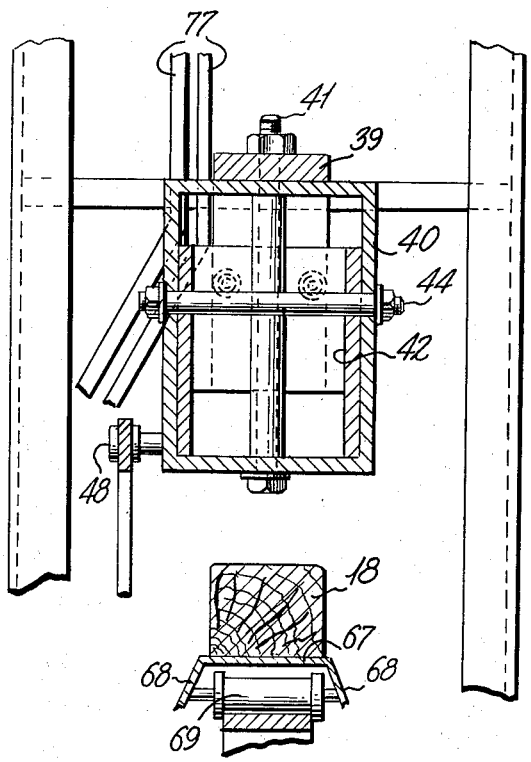
Figure 7 is a vertical, transverse section taken on the line 7—7 of Figure 3.
Figures 8, 9:
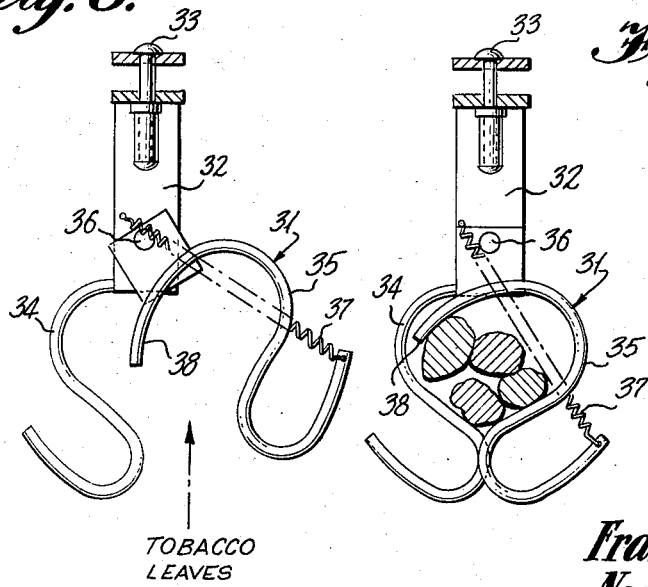
Figure 8 is a section through a leaf-conveying chain showing in plan one of the spring-tensioned clips which hold tobacco leaves in open position.
Figure 9 is a view similar to Figure 8 with the clip closed.

The advancement of the stick is caused by movement of the tying mechanism. The stick holder is shown as an elongated member formed of sheet metal and straddling the truss 11. The holder has a flat top surface 67, to form a seat for a tobacco stick, from the opposite sides of which side walls or skirts 68 depend downwardly on opposite sides of the truss. A plurality of rollers 69 are mounted between the walls adjacent the top to ride upon the truss and provide for easy movement of the stick holder upon the truss. The holder carries a pair of clips 70 to engage and hold the opposite ends of the tobacco stick 18. Along one side of the holder a length of chain, or a section of rack 71 is horizontally positioned for engagement with a sprocket, or gear, 72. The sprocket is mounted upon a shaft 73, journalled in bearings 74 fixed to the vertical frame 8. Shaft 73 carries a pair of ratchet gears 75 turned by pawls 76 pivotally secured to the ends of levers 77. The levers are pivoted intermediate their ends to the bracket 39 and have their opposite ends pivotally connected to cam follower arms 78. The forward ends of the arms 78 are bifurcated to surround shaft 16, and each is provided with a roller 79 on its underside to follow one of the cams 80 carried by the shaft 16. Coil springs 81 are connected between the arms 78 and the shaft 16 to hold the rollers in engagement with the cams. The cams are angularly related, as shown in Figure 4, and positioned so that each will be effective to cause rearward movement of the arm 76 which it controls when the string tying arm 62 reaches a predetermined position in its oscillatory movement. In other words, each cam operates its follower arm during the latter part of a cycle of oscillation of the tying or looping mechanism. One will be effective during clockwise oscillation and the other during counterclockwise oscillation. Rearward movement of arms 78 will rock the levers to which they are connected and thereby move the pawls 76 forwardly to rotate the shaft 73 and thus cause one step of forward movement of the stick holder. It will be understood that the cams cause the respective pawls to operate in alternation during opposite oscillatory movements of the tying mechanism. The pawls 76 are held in engagement with their respective ratchets by means of coil springs 82 which are connected to the pawls and the vertical frame 8. Spring 50 are also connected to the pawls 76, but they have no effect to overcome the action of springs 82 until latch 47 is tripped, whereupon the springs 50 will exert a greater pull upon the pawls than the springs 82 and lift the pawls from their ratchets.

Figure 2:
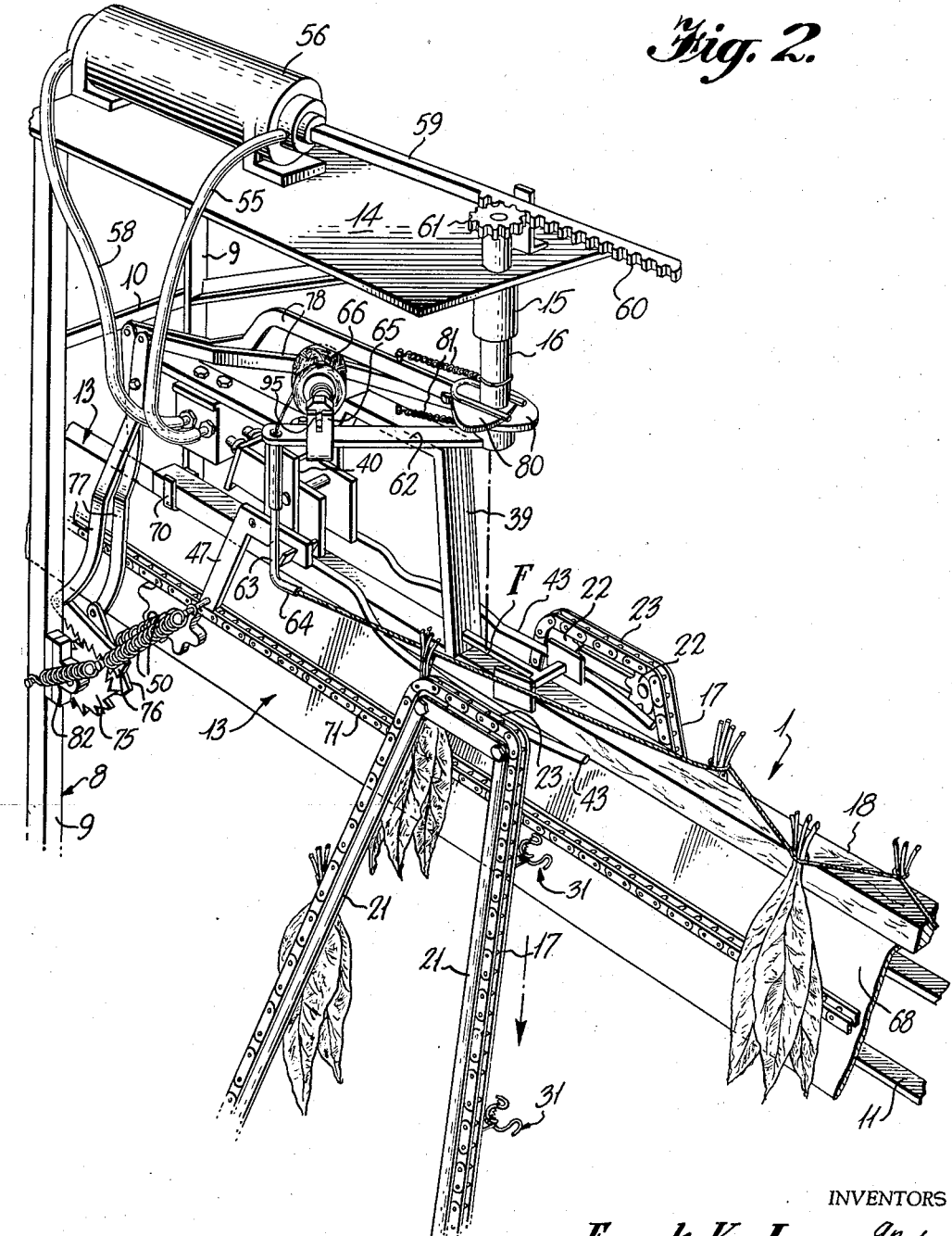
Figure 2 is a perspective view of most of the operating mechanism of the machine.

In using the device an operator will place a tobacco stick upon the stick carrier 13 and push the carrier rearwardly, or to the left as viewed in Figure 1, until the end of the stick is just forward of the focal point F, or in the position shown in Figure 1. The spool of string is placed on the holder 65 and its end is threaded through the string guide 63 and stapled or tied to the end of the stick on the stick holder. This causes the string to be stretched from the thread guide, in the position in which it is seen in Figure 4, to the point of connection with the stick which is approximately at the point C of Figure 4. The machine will then be driven across the field, and pickers in the seats 3 will pick the ripened leaves and place several as a bundle in each of the clips of the feed chains as the chains move along their paths. Both chains move in the same direction, and along their horizontal upper flights 23 will be moving forwardly. As the bundles of leaves arrive at the beginning of the top horizontal flights of the chains, they will strike the arms 43 of the trip mechanism and, as the leaves move along the chain path, shift the trip mechanism to the opposite side. By the time that this shift has been made so that the valve 54 is actuated, the bundle of leaves will be in front of the cordal length of string extending from the point of attachment to the stick to the string guide. Thus, when the valve is operated and air flows to the cylinder 56 to force the piston outwardly and rotate the tying arm, the string will be brought up behind the stems of the leaf bundle and completely around the bundle by the time that the tying arm has reached its halfway point and is overlying the stick. Continued movement of the tying arm will pull the bundle from the clip on the feeding chain and draw it snugly up against the side of the stick. As the tying arm leaves its position overlying the stick and begins the second half of its arcuate movement, appropriate cam 80 will begin to move its follower arm 78, thus initiating movement of the stick carrier to carry the stick and its newly tied bundle of leaves forwardly, so that the tied bundle is outside of the rotational orbit of the tying mechansm. At this time, the bundle will occupy the position shown at P in Figure 4. Another bundle of leaves is at this time entering the horizontal stretch of the other feed chain and beginning to contact the trip arm on the opposite side. As it moves forwardly, it will completely trip the arm to reverse the movement of the cylinder 56 and the tying arm. As the bundle moves forwardly, tripping the arm, it will be in front of the string so that when the tying mechanism starts its movement it will form a loop about a bundle of leaves first on one side of the stick and then on the other side, with the stick moving forwardly between the tying motions so that the bundles will be held at spaced intervals and in staggered relation along the stick. This arrangement is clearly shown in Figure 2.

With the movement of the tying mechanism being controlled by leaves fed by the feed chains, and the movement of the stick being controlled in turn by the operation of the tying mechanism, there will be no movement of the mechanism except for the feed chains unless leaves are presented adjacent the focal point in alternation by the two feed chains. If a bundle of leaves on one chain should operate the trip and the tying and stick movements be accomplished, and there are no leaves in the next clip on the opposite chain, additional leaves in subsequent clips on the first chain will have no effect, as the trip will already be moved from that particular side and no tying action will result. These leaves will continue to move along the chain path until a bundle of leaves on the opposite chain throws the trip in the opposite direction. This assures perfect arrangement of leaves on the stick, and makes the control of that arrangement entirely automatic.

The tying operations continue and the stick is moved forwardly until it is filled for substantially its entire length. At this time the string is stapled or tied to the trailing end of the stick and the stick removed from the holder. A new stick is then put in place, the holder retracted to its original position and the cut end of the string fastened to the leading end of the stick. It is not necessary for the operator to pay close attention to the tying operations as the mechanism will automatically stop when the end of a stick is reached. This occurs when the stop 51 on the stick holder reaches and trips latch 47, permitting spring 45 to tilt the trip arms upwardly out of reach of leaves approaching on the feed chains. At the same time, the release movement of the latch will lift the pawls 76 from the ratchets 75 so that the stick holder can be freely returned to its starting position. As soon as this position is reached and the arms moved downwardly to operative position, latch 47 will move into place holding the arms and at the same time the pawls will move back into operative contact with the ratchets.

While in the above one practical embodiment of the invention has been disclosed, it will be understood that the details of construction shown and described are merely by way of illustration and the invention may take other forms within the scope of the appended claims.

What is claimed is:

1. A device for tying tobacco leaves on sticks for curing comprising, a tying station, means for supporting a stick at the tying station, means to feed leaves to the tying station from opposite sides of said stick-supporting means, means for looping string about leaves at the tying station, means to operate said leaf-looping means triggered by arrival of leaves at the tying station, and means to advance the stick-supporting means controlled by movement of the leaf-looping means.

2. In a tobacco tying device as claimed in claim 1, said leaf-feeding means arranged to feed leaves to said tying station in alternation from opposite sides whereby said leaves may be tied upon opposite sides of a stick on the stick support at spaced points therealong.

3. A device for tying tobacco leaves on sticks for curing comprising, a tying station, means for supporting a stick at the tying station, means to feed leaves to the tying station from opposite sides of said stick-supporting means, means for looping string about leaves at the tying station, means to operate said leaf-looping means, means positionable in the paths of movement of leaves approaching the tying station to control the leaf-looping operating means, and means to advance the stick-supporting means controlled by movement of the leaf-looping means.

4. In a device for tying tobacco leaves as claimed in claim 3, said leaf-feeding means arranged to feed leaves to the tying station in alternation from opposite sides thereof.

5. In a device for tying tobacco leaves as claimed in claim 4, said means to control the leaf-looping operating means being movable by contact with leaves approaching the tying station from one side to lie in the path of movement of leaves approaching from the opposite side, whereby said leaf-looping operating means must be controlled alternately by leaves approaching the tying station from opposite sides.

6. A device for tying tobacco leaves on sticks for curing comprising, a frame, means for supporting sticks slidably mounted on the frame, a vertical shaft rotatably mounted on said frame with the projected axis of the shaft intersecting the path of movement of the slidable stick support, means to feed leaves from remote points to positions adjacent the projected axis of said shaft from opposite sides of said path of movement of the stick support, means connected to said shaft to loop string about leaves at the positions adjacent said projected axis, fluid operated means to oscillate said shaft to operate said looping means, valve means to control said fluid operated means, and means actuated by arrival of leaves at said positions adjacent said projected axis to control said valve means.

7. In a device for tying tobacco leaves on sticks for curing as claimed in claim 6, said valve means including a pair of actuating plungers spaced transversely of the path of movement of the stick support, said valve control means comprising a trip mounted intermediate its ends on said frame for horizontal swinging movement, one end of said trip when swung in one direction being in the path of movement of leaves approaching said projected axis from one side and when swung to the other side being in the path of movement of leaves approaching from the other side, and the other end of said trip having means to contact and actuate the valve means plungers in alternation as the trip is swung from side to side.

8. In a device for tying tobacco leaves on sticks for curing as claimed in claim 6, means to move said stick support step-by-step actuated by movement of the leaf-looping means.

9. In a device for tying tobacco leaves on sticks for curing as claimed in claim 6, a rack on said stick support, a gear meshing with said rack, a ratchet wheel fixed to said gear, a pawl engageable with the ratchet wheel, and means to move said pawl including a cam on said shaft and a cam follower connected to the pawl.

10. In a device for tying tobacco leaves on sticks for curing as claimed in claim 6, said leaf-looping means comprising a looping arm carried by said shaft in a horizontal plane above the plane of a stick on said stick support, and a string guide depending from said arm at a distance from the axis of said shaft greater than the distance of leaves on said feed means from said projected axis when at said positions adjacent said projected axis.

11. In a device for tying tobacco leaves on sticks for curing comprising, a frame, means for supporting sticks slidably mounted on the frame, a vertical shaft mounted on said frame with the projected axis of the shaft intersecting the path of movement of the slidable stick support, feed chains on opposite sides of the path of movement of the stick support having leaf-receiving clips thereon with the clips of one chain staggered with respect to the clips of the other chain, each chain having a portion of its path adjacent the projected axis of said shaft, means connected to said shaft to loop string around leaves held in clips on the chains when in the chain path adjacent the projected axis of the shaft, fluid operated means to oscillate said shaft to operate said looping means, valve means to control the fluid operated means, means actuated by movement of leaves in the chain clips while on the chain path adjacent the projected axis of the shaft to control the valve means, and means operated by oscillation of the shaft to cause step-by-step movement of the stick support.

12. In a device for tying tobacco leaves on sticks for curing as claimed in claim 11, said frame being mounted on a wheeled chassis.

13. In a device for tying tobacco leaves on sticks for curing as claimed in claim 11, said valve means including a pair of actuating plungers spaced transversely of the path of movement of the stick support, said valve control means comprising a trip mounted intermediate its ends on the frame for horizontal swinging movement, one end of the trip when swung in one direction being in position to be struck by leaves in clips on one chain on the chain path adjacent the projected axis of the shaft and when swung to the other side in a similar position with respect to leaves in the clips of the other chain, and the other end of said trip having means to contact and actuate the valve means plungers in alternation as the trip is swung from side to side.

14. In a device for tying tobacco leaves on sticks for curing as claimed in claim 11, said leaf-looping means comprising a looping arm carried by the shaft in a horizontal plane above the plane of a stick on the stick support, and a string guide depending from the arm at a distance from the axis of the shaft greater than the distance of leaves in clips from the projected axis when on the portion of the chain paths adjacent the projected axis of the shaft.

15. In a device for tying tobacco leaves on sticks for curing as claimed in claim 11, means to render the valve control means inoperative when the stick support reaches the limit of its movement.

16. In a device for tying tobacco leaves on sticks for curing as claimed in claim 11, means included in said string-looping means to maintain the string under tension and to retract said string when tension thereon is released.

17. In a device for tying tobacco leaves on sticks for curing as claimed in claim 1, said means to loop string around the leaves including, an oscillatable string guide, means on said string guide to support a string supply, and means energizable by drawing string from said string supply to retract the string when tension on the string is released.

References Cited in the file of this patent
UNITED STATES PATENTS

| | | |
|---|---|---|
| 877,232 | Rolland | Jan. 21, 1908 |
| 1,969,877 | Doty | Aug. 14, 1934 |
| 2,652,932 | Funnell | Sept. 22, 1953 |